April 26, 1938. H. I. BECKER 2,115,568
DISTANCE AND SPEED MEASUREMENT OF MOVING CRAFT
Filed Dec. 31, 1935
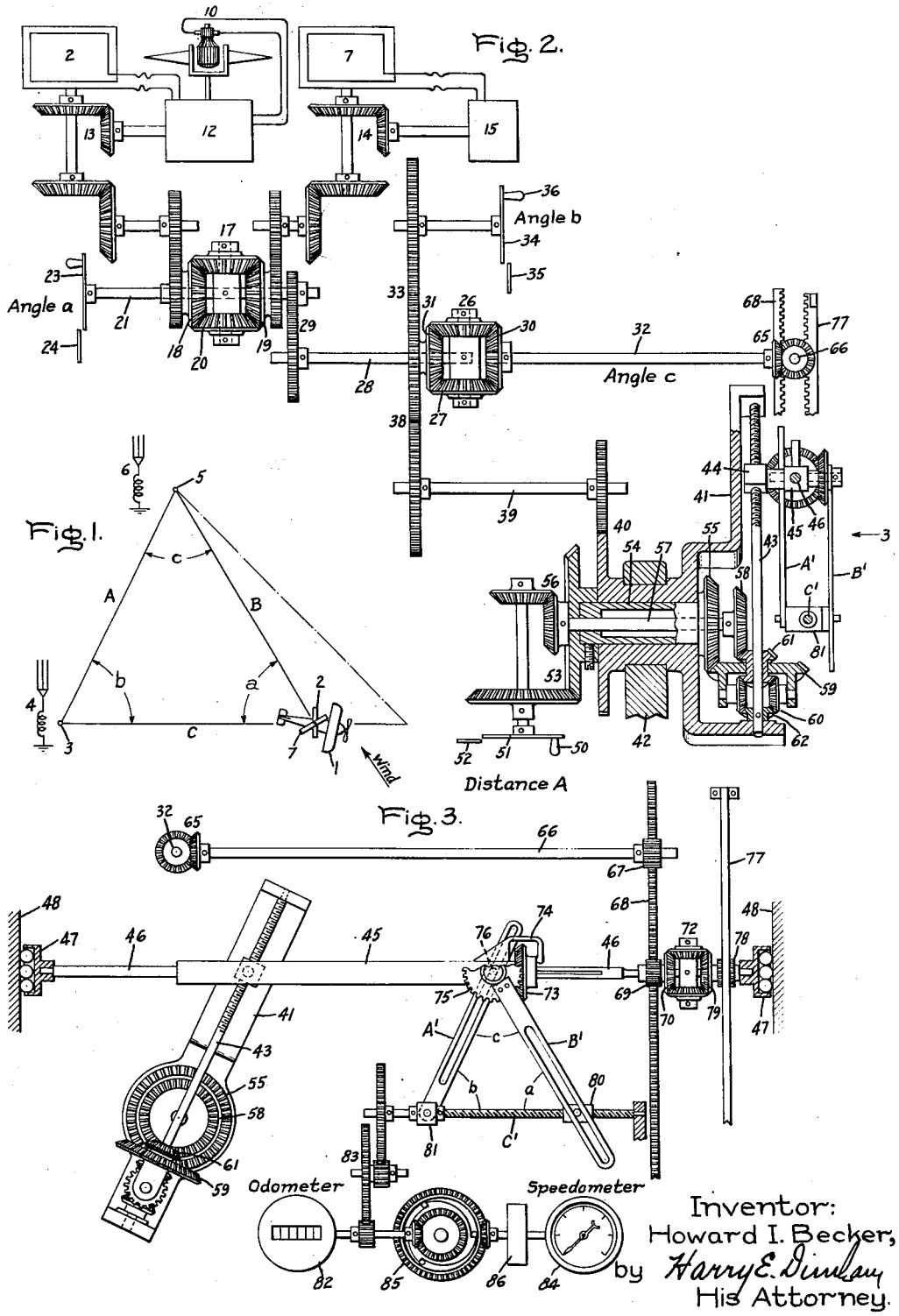
Inventor:
Howard I. Becker,
by Harry E. Dunlap
His Attorney.

Patented Apr. 26, 1938

2,115,568

UNITED STATES PATENT OFFICE 2,115,568

DISTANCE AND SPEED MEASUREMENT OF MOVING CRAFT

Howard I. Becker, Schenectady, N. Y., assignor to General Electric Company, a corporation of New York Application December 31, 1935, Serial No. 56,953

11 Claims. (Cl. 250—11)

My invention relates to moving craft, such for example as air or water craft, which are caused to travel in a predetermined straight course. One object of my invention is the provision of improved means on the craft for measuring the distance traversed thereby. A further object of my invention is to provide improved means on the craft for measuring the speed thereof.

The craft may be steered manually to take the necessary straight course or any desired means may be employed for steering it automatically. In my Patent No. 1,958,259 of May 8, 1934, I have disclosed a suitable steering equipment whereby the craft may be steered automatically by means controlled by radio apparatus so as to travel in a straight line toward a point of destination regardless of the effect of side forces, such for example as side winds, which tend to throw the craft off its course. In that patent the steering of the craft is effected by the use of a magnetic compass and a radio transmitting system which is assumed to be located in proximity to the destination. It may, however, be located at any point on the line connecting the "start" and the "destination" or a continuation of that line. I have chosen to show and describe my present invention as applied to the steering equipment disclosed in said patent although it will be understood that the craft may be steered in the straight course by any other desired means or even manually.

In accordance with my invention I provide a source of radiant energy arranged at one side of the course to be traveled by the craft and provide the craft with a radiant energy receiving means adapted to receive energy from said source and having a directive receptor, such as a directive antenna, in combination with means for maintaining the receptor oriented with respect to said source. The point at which the source is located, the point on the course marking the position of the craft at any instant and some other chosen fixed point on the course form a triangle. In this triangle the length of that side joining the source and the chosen point is known; also the angle at the chosen point is known. By the position of the receptor at any instant with respect to the course the angle at the point marking the position of the craft is known; hence the length of that side of the triangle lying on the course becomes known which is the distance between the chosen point and the craft. The rate of angular movement of the receptor also gives the speed of the craft. I have provided a movable member controlled by said receptor whose movement is a measure of said distance; also the rate of movement of said member is a measure of the speed of the craft.

My invention will be better understood from the following description taken in connection with the accompanying drawing, and its scope will be pointed out in the appended claims.

Referring to the drawing, Fig. 1 is a diagram showing the relative arrangement of the course of the craft, the sources of radiant energy etc.; Figs. 2 and 3 show one form of apparatus for giving the distance and speed of the craft in accordance with my invention, Fig. 3 being a side view of a portion of the apparatus of Fig. 2 looking in the direction of the arrow 3.

In Fig. 1, I have represented the craft, such as an airplane, at 1 which is traveling on the straight course represented by the line C. If desired the craft may be steered in the straight line manually but I have chosen to show it provided with means for automatically keeping it on the straight course, which means is disclosed in my Patent No. 1,958,259, dated May 8, 1934. As in that patent the craft is provided with a compass and radio receiver including a directive receptor such as a directive antenna which is illustrated as the loop 2. Also at some point on the course, for example, at the point 3 is a source of radiant energy such as a radio transmitter represented diagrammatically at 4, corresponding to transmitter 72 of the patent, to the frequency of which the radio receiver is tuned and with respect to which the receiver loop is oriented. The craft being thus provided with apparatus such as disclosed in the above-mentioned patent is automatically steered in the direction of the course C, it being noted that in this case the craft is flying away from the radio transmitter instead of toward it as in the patent.

At some chosen point at one side of the course C, such as the point 5, I provide a second source of radiant energy such as a radio transmitter represented diagrammatically at 6. The length of the line A between the point 5 and the point 3 on the course is known; also the angle b between the line A and the course C is known.

I provide the craft with a second radio receiver having a directive receptor such as a directive antenna which is illustrated as being in the form of a loop represented at 7, which receiver is tuned to the frequency of the transmitter 6. The loop 7 is provided with suitable means for maintaining it oriented at all times with respect to the radio transmitter 6. Such means may, for example, be like that employed in my above-mentioned patent for maintaining the pole pieces of the magnetic compass oriented with respect to the earth's magnetic field, whereby when the loop 7 extends at right angles to the direction of the path of energy received from the transmitter 6, as represented by the line B, no voltage is produced in the loop and the driving mechanism therefore remains at rest.

It will be seen that as the craft travels along the course the length of the line C of the triangle A, B, C increases, angle c increases and angle a decreases, the angular position of the loop 7 with respect to loop 2 changing with the angle a. Since in the triangle A, B, C the side A and the angle b are known, the length of the side C is determined by the angle a. By the apparatus which I shall now describe I form a small triangle on the craft which is similar in form to the triangle A, B, C by means of three members and I cause the triangle so formed to change its shape automatically in proportion to the change in the shape of triangle A, B, C. Thus in the triangle so formed the length of that side corresponding to side C of the large triangle is a measure at all times during the progress of the craft of the distance between point 3 and the craft. Also the rate of change of the length of that side of the small triangle is a measure of the speed of the craft.

Referring now to Fig. 2, the magnetic compass 10 corresponds to the magnetic compass 1 of the aforesaid patent and the receiver loop 2 corresponds to the loop 24 of said patent. The cooperating means by which the craft is steered so as to keep a straight course, regardless of the effect of such disturbing influences as side winds, is the same as that disclosed in the aforementioned patent, and is represented in its entirety by the rectangle 12 to which the radio loop 2 is shown connected by the bevel gearing 13. This means it will be understood includes a course setting device like the device 70 of said patent by which the loop is initially adjusted to the proper angle. Radio loop 7 connects through the bevel gearing 14 with any suitable apparatus, represented at 15, for orienting the loop with respect to the radio transmitter 6, such for example as that shown in the aforesaid patent for orienting the pole pieces of the magnetic compass. In order to obtain the angle a in Fig. 1 which is the angle between the two loops 2 and 7 I provide the differential gear 17, the two main gears 18 and 19 of which connect respectively through other gearing with the loops 2 and 7 and the spider 20 of which is pinned to the shaft 21. On this shaft is the scale 23 cooperating with the fixed pointer 24 whereby the angle a may be read off. For a reason to be explained later it is desirable to know the changing angle c. This is obtained by the use of the differential gear 26 the spider 27 of which connects through the shaft 28 and gearing 29 with shaft 21 and the main gears 30 and 31 of which connect respectively with shaft 32 and the scale 34 through gearing 33. This scale cooperates with the fixed pointer 35 and has the handle 36 by which the fixed angle b may be set into the mechanism. Thus the position of the shaft 32 is a measure of angle c.

As mentioned above, I obtain the distance traveled by the craft and the speed thereof by forming a mechanical triangle on the craft whose shape is similar to that of the large triangle A, B, C, and which automatically changes in form like the larger triangle as the craft travels on its course. This mechanical triangle is formed by the link A', the arm B' and the screw C'. I shall now describe the means by which the known angle b and side A of the large triangle are initially set into the triangle A', B', and C' and by which the angle between A' and B' is continuously kept equal to the changing angle c of the large triangle.

For setting the angle b into the mechanism the angular position of scale 34, being angle b, is transmitted through the gearing 33 and 38, shaft 39, and gearing 40 to the rotatable frame 41 which is journalled in the base 42 and carries the screw 43. On this screw is threaded the nut 44 having an extension on which is pivoted the square rod 45. This rod is maintained in a horizontal position but is movable vertically by being slidably mounted on the rod 46 which at opposite ends is provided with bearings 47 engaging suitable vertical guides 48. Link A' has a fixed pivot at its lower end in alinement with the axis of frame 41 and has a pin and slot connection with rod 45 whereby it inclines at the same angle as the frame 41 and makes angle b with screw C'.

The distance A is set into the mechanism by means of the handle 50 and scale 51 cooperating with pointer 52. Inasmuch as it is not desirable to have the handle 50 and scale 51 rotate bodily with the frame 41 when it is adjusted it is necessary to provide suitable gear mechanism between the handle and the screw 43 which will prevent turning of the screw except when the handle and scale are adjusted. Such mechanism comprises the bevel gearing 53 by which sleeve 54 carrying gear 55 is rotated and the bevel gearing 56 by which the shaft 57 carrying gear 58 is rotated. Gear 59 meshing with gear 55 supports the spider of the differential gear 60 of which one main gear 61 meshes with gear 58 and of which the other main gear 62 is pinned to the screw 43.

I shall now describe how the angle c is continually fed into the mechanism, that is, the angle that B' makes with respect to A' in response to the turning of loop 7 as the craft travels along the course. It has been shown above that the angular position of the shaft 32 is a measure of this angle c. It remains therefore to adjust arm B' in accordance with this shaft.

Movement of the shaft 32 is transmitted through the bevel gearing 65 to the shaft 66 and through the pinion 67 thereon to the slidable rack 68. Movement of this rack is transmitted through the pinion 69, the main gear 70 and the spider of the differential gear 72 to the shaft 46. Splined on this shaft is the bevel gear 73 which is held in engagement with the end of the rod 45 by means of the finger 74. Bevel gear 75 which meshes with bevel gear 73 is pivotally mounted on the rod 45 concentric with the pin 76 which engages link A' and to this bevel gear 75 is secured the arm B'. Thus in response to the orientation of the loop 7 the arm B' is caused to assume an angular position which corresponds with the angular position of the side B of the large triangle. The purpose of the provision of the differential gear 72 is to prevent any undesired angular movement of the arm B' in response to the raising or lowering of the rod 45 when the distance A is being set into the mechanism. This is accomplished by the differential gear 72 and the fixed rack 77 which meshes with the gear 78 rotatable on shaft 46 and fixed to the other main gear 79 of the differential gear. Thus when the position of rod 45 is adjusted by turning the scale 51 to set distance A into the mechanism, the angular position of arm B' is not changed. The connection between the arm B' and the screw C' is through the nut 80 having a pin and slot connection with the arm B'. The link A' is pivotally connected to one end of the screw C' through the sleeve 81.

The angle b and the distance A having been initially set into the mechanism whereby the corresponding angle in triangle A', B', C' was set an equal amount and the effective length of the link A' was set, as the craft travels on its course, the angle c between A' and B' is continually changed in response to the change in position of the loop 7. Thus the small triangle A', B', C' at all times is exactly similar to the large triangle A, B, C. The effective length of the screw C' thus is a measure of the distance traversed by the craft and the speed of rotation of the screw C' is a measure of the speed of the craft. The amount of rotation of the screw C' which is a measure of the distance traversed by the craft is indicated by the odometer 82 to which the shaft is shown connected by the gearing 83. Inasmuch as the loop 7 does not follow the changing position of the transmitter 6 with a steady movement but follows it rather in a series of small increments, the rotation of the screw C' is accordingly intermittent. I therefore employ means for reducing this intermittent motion to a steady movement whereby I may employ a speedometer 84 of a well-known form. Such means I have shown as a well-known form of over-running clutch 85 and between the clutch and the speedometer I employ the flywheel 86.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States is:

1. In a system wherein a moving craft is steered on a straight course, a source of radiant energy at one side of said course, a receptor of said energy on said craft, means by which said receptor may be maintained oriented with respect to said source and means responsive to the change in orientation of said receptor as the craft progresses and operative independently of any other radiant energy receptor on the craft for computing the distance traversed by the craft.

2. In a system wherein a moving craft is steered on a straight course, a source of radiant energy at one side of said course, a receptor of said energy on said craft, means by which said receptor may be maintained oriented with respect to said source and means responsive to the rate of change in orientation of said receptor and operative independently of any other radiant energy receptor on the craft for indicating the speed of said craft.

3. In combination, a source of radiant energy, a craft, a receptor thereon for said energy, means for maintaining the receptor oriented with respect to said source, and means on said craft responsive to the change in orientation of said receptor alone for computing the distance traveled by said craft from any desired point on a straight course in any direction.

4. In combination, a source of radiant energy, a craft, a receptor thereon for said energy, means for maintaining the receptor oriented with respect to said source, and means on said craft responsive to the rate of change in orientation of said receptor alone for indicating the speed of said craft when traveling from any desired point on a straight course in any direction.

5. In combination with means for steering a moving craft on a straight course including a radio transmitter positioned on said course and a directive radio receptor mounted on said craft having means for maintaining it oriented with respect to said transmitter in response to energy received therefrom, a second radio transmitter at one side of said course, a second directive radio receptor on said craft having means for maintaining it oriented with respect to said second transmitter in response to energy received therefrom and means responsive to the change in angular relation between said two radio receptors as the craft progresses for measuring the distance traversed by the craft.

6. In combination with means for steering a moving craft on a straight course including a radio transmitter positioned on said line and a directive radio receptor mounted on said craft having means for maintaining it oriented with respect to said transmitter in response to energy received therefrom, a second radio transmitter at one side of said course, a second directive radio receptor on said craft having means for maintaining it oriented with respect to said second transmitter in response to energy received therefrom and means responsive to the rate of change in angular relation between said two receptors for indicating the speed of the craft.

7. In combination, a craft arranged to travel on a straight course, a radio transmitter at one side of said course, the distance of said transmitter from a fixed point on said course and the angle of said transmitter with reference to said course being known, a directive radio receptor on said craft, means by which said receptor may be adjusted to maintain it in a predetermined orientation with respect to said transmitter as the craft travels and means operated in response to said distance and angle and to the adjustment of said receptor for indicating the distance traveled by said craft.

8. In combination, a craft arranged to travel on a straight course, a radio transmitter at one side of said course, the distance of said transmitter from a fixed point on said course and the angle of said transmitter with reference to said course being known, a directive radio receptor on said craft, means for automatically maintaining said receptor in a predetermined orientation with reference to said transmitter in response to energy received thereby and means responsive to said distance and angle and to the change in orientation of said receptor as the craft travels for indicating the distance it has traveled.

9. In combination, a craft arranged to travel on a straight course, a radio transmitter at a distant point at one side of said course, the distance of said point from a predetermined point on said course and the angle of the line connecting said points with respect to said course being known, a radio receiver on said craft having a directive antenna, means for maintaining said antenna in a predetermined orientation with respect to said transmitter, a plurality of members forming a triangle similar in shape to the triangle formed by the two said points and a point marking the position of the craft and means responsive to said distance and angle and to the angular change of said receiver for moving one of said members to preserve the similarity of said triangles as the craft travels.

10. In combination, a craft arranged to travel on a straight course, a radio transmitter at a distant point at one side of said course, the distance of said point from a predetermined point on said line and the angle of the line connecting said points with respect to said course being known, a radio receiver on said craft having a directive antenna, means for maintaining said antenna in a predetermined orientation with respect to said transmitter, a plurality of members forming a triangle similar in shape to the triangle formed by the two said points and a point marking the position of the craft and means responsive to said distance and angle and to the angular change of said antenna for changing the effective length of that member corresponding to the course traveled by the craft to preserve the similarity of the two triangles as the craft travels and means responsive to said change in effective length for indicating the distance the craft has traveled.

11. In combination, a craft and means for causing it to travel on a straight course, a radio transmitter at a distant point at one side of said course, the length of the line connecting said point and a predetermined point on said course and the angle which said line makes with said course being known, a radio receiver having a directive antenna on said craft, means for angularly moving said antenna to maintain it in a predetermined orientation with respect to said source, a plurality of members adapted to form a triangle similar in form to that formed by the two said points and a point on the course marking the position of the craft, means for setting those two members corresponding to said course and said line at said known angle, means for setting the length of said member corresponding to said line at a predetermined proportion of the length of said line, means responsive to the angular movement of said antenna as the craft travels for angularly moving the third member of said triangle to maintain said triangles similar and means responsive to the resulting change in length of that side of the triangle of members corresponding to said course for indicating the speed of and the distance traveled by the craft.

HOWARD I. BECKER.